(12) United States Patent
Ruff

(10) Patent No.: US 6,860,566 B2
(45) Date of Patent: Mar. 1, 2005

(54) HARNESSES AND INERTIA REELS

(75) Inventor: Steven Anthony George Ruff, Buckinghamshire (GB)

(73) Assignee: Martin-Baker Aircraft Company, Limited, Middlesex (GB)

( * ) Notice: Subject to any disclaimer, the term of this patent is extended or adjusted under 35 U.S.C. 154(b) by 0 days.

(21) Appl. No.: 10/304,374

(22) Filed: Nov. 26, 2002

(65) Prior Publication Data
US 2003/0098603 A1 May 29, 2003

Related U.S. Application Data

(62) Division of application No. 09/872,853, filed on May 31, 2001, now Pat. No. 6,742,848.

(30) Foreign Application Priority Data
May 28, 2001 (GB) .............................................. 0107782

(51) Int. Cl.[7] .............................................. B60R 21/00
(52) U.S. Cl. ....................... 297/480; 297/478; 297/476; 242/381.3
(58) Field of Search ................................ 297/476, 475, 297/479, 478; 242/381.3

(56) References Cited

U.S. PATENT DOCUMENTS

| 1,239,041 | A | | 9/1917 | Roe |
|---|---|---|---|---|
| 2,822,595 | A | * | 2/1958 | Ruhl |
| 3,823,978 | A | * | 7/1974 | Dove |
| 3,871,599 | A | | 3/1975 | Takada |
| 4,451,062 | A | | 5/1984 | Ziv |
| 4,484,766 | A | * | 11/1984 | Buchmeier |
| 4,637,629 | A | | 1/1987 | Cummings |
| 4,650,214 | A | * | 3/1987 | Higbee |
| 4,706,992 | A | | 11/1987 | Downing et al. |
| 5,063,879 | A | | 11/1991 | Vorbau |
| 5,544,363 | A | | 8/1996 | McCue et al. |
| 5,733,014 | A | | 3/1998 | Murray |
| 5,887,550 | A | | 3/1999 | Levine et al. |
| 6,179,329 | B1 | | 1/2001 | Bradley |

FOREIGN PATENT DOCUMENTS

| DE | 3824527 A1 | 11/1989 |
|---|---|---|
| EP | 0 608 530 A1 | 8/1994 |
| GB | 2005130 * | 4/1979 |
| GB | 2 217 973 A | 11/1989 |
| GB | 2 228 663 A | 9/1990 |
| GB | 2 235 862 A | 3/1991 |
| GB | 2 239 387 A | 7/1991 |
| GB | 2 302 261 A | 1/1997 |

OTHER PUBLICATIONS

European Search Report.

* cited by examiner

Primary Examiner—Milton Nelson, Jr.
(74) Attorney, Agent, or Firm—Fulwider Patton Lee & Utecht, LLP

(57) ABSTRACT

A spring loaded pay out arrangement for a seat harness securable to a seat, the seat harness being releasably connectable to an occupant harness configured to be worn by an occupant of the seat.

8 Claims, 4 Drawing Sheets

HARNESSES AND INERTIA REELS

RELATED APPLICATIONS

This is a divisional of Ser. No. 09/872,853 filed May 31, 2001 now U.S. Pat. No. 6,742,848.

THE PRESENT INVENTION relates to a harness arrangement for a seat and inertia reel arrangement.

It is well known to provide a harness to restrain an occupant in a seat, and such arrangements are used extensively in the aircraft industry. Typical aircraft seat harnesses usually comprise a plurality of straps, for example a pair of shoulder straps passing from the seat over respective shoulders of the occupant, and a pair of waist straps passing from the seat and at least partially around the waist of the occupant from respective sides. All of the straps are typically provided with a metal lug at their ends, the lug being adapted to be releasably engaged within a quick release locking arrangement, commonly known in the art as a quick release box. It will therefore be understood that conventional aircraft seat harnesses are multi-point arrangements, comprising a number of straps which all engage within a single quick release box which is provided with actuating means which the occupant can trigger to release the plurality of straps and hence allow egress from the seat.

Conventional aircraft seat harnesses are designed to retain an occupant securely in the seat, allowing a very limited degree of movement so as to protect the occupant from injury in the event of sudden aircraft maneuvers or crash situations. However, in certain fields of aviation, there is a need for an aircraft's crew to be able to leave their seats and perform certain tasks once the aircraft is airborne. This is true, for example, of emergency services such as helicopter search and rescue services. In such fields, it can be necessary for a medic or winch-man to leave his seat and perform tasks away from the seat, which may involve being situated in the vicinity of an open aircraft door, or even, particularly in the case of a winch-man, involve leaning out of the aircraft. For safety and security, air crew performing such tasks are required to wear harnesses which not only securely restrain them in their seats for take off and landing, but also allow the air crew to move around relatively freely, away from their seats, to perform their necessary tasks. This is typically achieved by providing a generally conventional seat harness as described above, with pay out devices, typically in the form of conventional inertia reels, to allow the length of webbing strap to be paid out from the seat, once the aircraft is airborne and the air crew member wishes to move around the aircraft cabin.

Current designs of such harnesses attempt to provide an arrangement which is safe for crash requirements and which also allows air crew freedom to stand up and perform their tasks. A person's body geometry alters significantly between standing and sitting positions. For example, the effective length of a human body between its abdominal region and its torso changes as a person stands up from a sitting position to a fully erect position, and hence a multiple point harness of the type described above which is tight enough to secure a seat occupant in a seat for take off and landing can become too tight and hence uncomfortable or painful when the occupant stands up to move away from the seat and perform his or her necessary tasks.

Attempts have previously been made to overcome the above mentioned technical problem, but they have generally involved providing elasticated elements to the harness which results in variable harness geometry which can be disadvantageous, particularly as it can result in the quick release box moving to an undesirable position which can again be uncomfortable and sometimes dangerous. Another problem of such known harness designs is that the security of the harness in the standing position can be compromised, because of a need to make the harness quickly removable for emergency egress.

A further problem arises from conventional harness arrangements which comprise inertia reels secured to the seat to allow the seat occupant to move away from the seat and perform his or her tasks. It is a current requirement that any seat restraint for use in civil aviation comprising a waist strap must be locked firmly with respect to the seat with no latent pay out, slack or play. Such waist straps cannot simply rely upon the locking of an inertia reel as is the case, for example, in the automotive industry.

It is an object of the present invention to provide an improved harness arrangement for a seat and an improved inertia reel arrangement.

According to a first aspect of the present invention, there is provided a harness arrangement for a seat, the arrangement comprising an occupant harness configured to be worn by an occupant of the seat, a separate seat harness securable to the seat, and means releasably to connect the seat harness to the occupant harness.

Preferably, the seat harness is configured to fit around or over at least part of the torso of the occupant when the seat harness is connected to the occupant's harness.

Advantageously, the seat harness comprises a plurality of straps including a shoulder strap which, in use, passes from the seat over a shoulder of the occupant and a waist strap which passes from the seat around at least part of the waist of the occupant when the seat harness is connected to the occupant harness.

Conveniently, the harness arrangement comprises two waist straps, each being configured, in use, to pass from the seat partly around the waist of the occupant from respective sides of the occupant; and two shoulder straps, each being configured to pass over a respective shoulder of the occupant, when the seat harness is connected to the occupant harness.

Preferably, each strap of the seat harness is configured for connection to the occupant harness at a point in front of the occupant when the occupant is wearing the occupant harness.

Advantageously, the occupant harness is configured to fit around the abdominal area of an occupant.

Conveniently, the occupant harness is configured so as to be substantially clear of the torso of an occupant.

Preferably, the harness arrangement includes means to pay out the seat harness from the seat to enable the occupant to move away from the seat.

Conveniently, the means to pay out comprises at least one spring loaded pay out device, which is preferably an inertia reel connected to the seat harness.

Advantageously, the means to pay out includes locking means to selectively lock the seat harness with respect to the seat.

According to a second aspect of the present invention, there is provided a spring loaded pay out arrangement for controlled pay out of a tether line, the arrangement comprising a spring loaded pay out real on which a tether line is wound; and locking means configured to engage the tether line at a position spaced from the wound line on the reel to prevent payout of the tether from the inertia reel independently of the inertia reel mechanism.

Preferably, the locking means is configured to engage the tether line at a predetermined point along the length of the tether line.

Advantageously, the predetermined point along the length of the tether line is defined by a locking element fixed to the tether line.

Conveniently, the locking means comprises a locking member configured to engage the locking element to prevent movement of the locking element past the locking member in a pay out direction.

Advantageously, the locking means is arranged to allow substantially unrestricted movement of the locking element past the locking member in a direction opposite to the pay out direction.

Conveniently, the locking member is mounted for pivotal movement.

Preferably, the locking member is biased towards the tether line.

Conveniently, the tether line is selected as one of the group consisting of: a strap, a cord and webbing.

Advantageous, the tether line is wound on the reel as a coil.

Conveniently, the spring loaded pay out reel is an inertia reel.

Preferably, a harness arrangement as defined above is provided with means to pay out the seat harness from the seat, the means to pay out comprising at least one inertia reel device as defined above.

So that the invention may be more readily understood, and so that further features thereof may be appreciated, embodiments will now be described, by way of example, with reference to the accompanying representations, in which.

The harness arrangement according to the first aspect of the present invention comprises two harness components, namely an occupant harness 1 configured to be worn by an occupant of the seat and a separate seat harness 2 which, when correctly installed, is secured to the seat 3. The two harnesses 1, 2 are releasably connectable to one another as will be described in more detail hereinafter.

Figure 1:
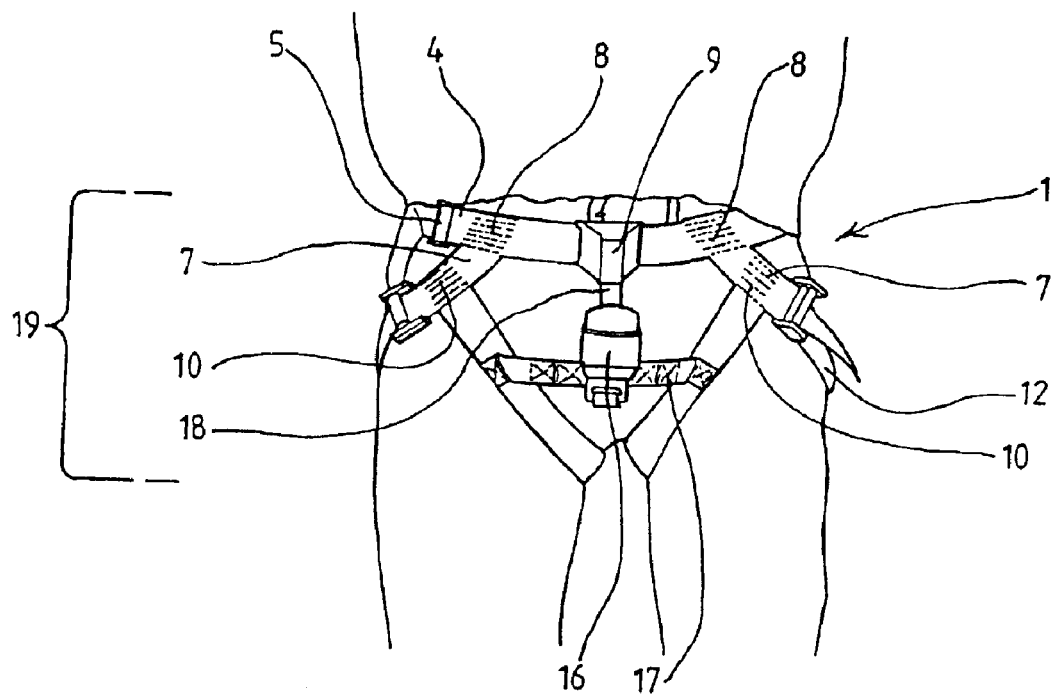
FIG. 1 is a front view of an occupant harness component of the present invention, worn by an occupant.
Figure 2:
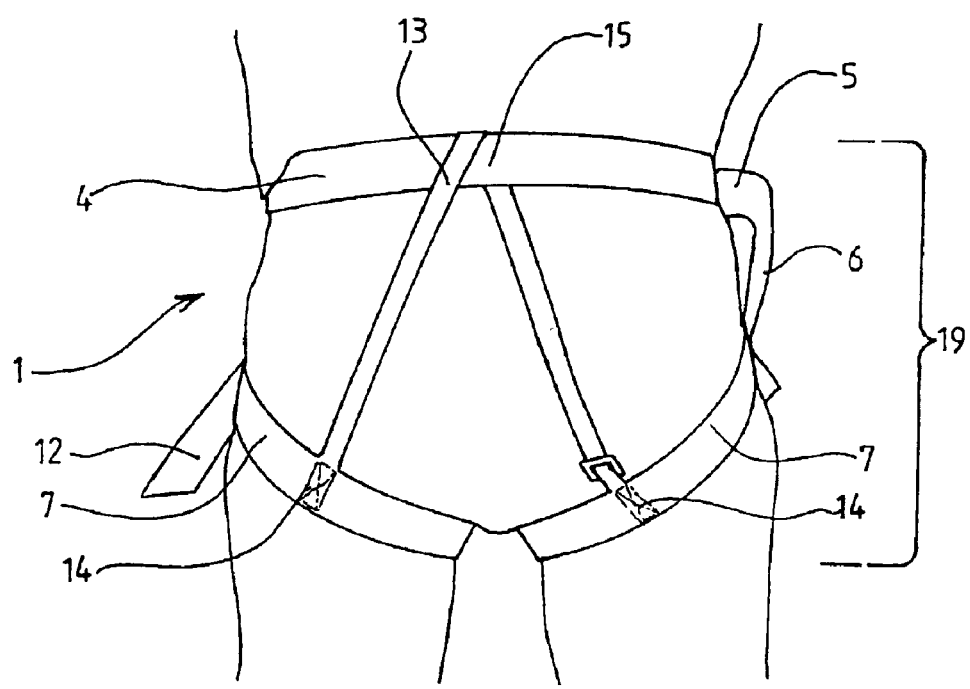
FIG. 2 is a rear view of the occupant harness illustrated in FIG. 1, again being worn by an occupant.

FIGS. 1 and 2 illustrate, from the front and back respectively, the occupant harness. It will be apparent to those skilled in the art of harnesses that the occupant harness 1 of the present invention is generally similar to a conventional rock climbing harness of a type known per se.

The occupant harness 1 comprises a plurality of webbing straps. One such webbing strap takes the form of a waist strap 4 which passes completely around the occupant's waist. The waist strap 4 is provided with a tensioner 5 of a friction-type known per se. In order to tension the waist strap 4, the occupant simply grasps a free end 6 of the waist strap 4 and pulls it through the friction tensioning device 5.

The occupant harness 1 also comprises a pair of thigh straps 7 which, as can be seen from FIG. 1, are stitched to the waist band 4 at positions 8 on respective sides of the front centre point 9 (which is located substantially directly above the occupant's groin area when the occupant is wearing the occupant harness 1) of the waist strap 4. The two thigh straps 7 each extend downwardly and outwardly from the centre of the waist strap 4 to pass around the back of the occupant's thighs, just below the occupants buttocks, and then to pass between the occupant's legs in the crutch region before passing upwardly, either side of the occupant's groin region. Each thigh strap 7 terminates at a point 10, located just below the waist strap 4, where the end of the thigh strap 7 is stitched to itself in a manner known per se to form a loop.

Each thigh strap 7 is again provided with a tensioning device 11 of a type generally identical to the tensioning device 5 provided on the waist strap 4. Each thigh strap 7 can therefore be tensioned simply by pulling on its free end 12 in a manner known per se.

At the back of the occupant harness 1, as illustrated in FIG. 2, there is provided a rear strap 13 which is secured by way of stitching at each end 14 to a respective thigh strap 7, at a position behind the occupant's legs. The rear strap 13 passes from one thigh strap 7 upwardly towards the rear central region 15 of the waist strap 4, where the rear strap 13 passes over the waist strap 4 and then passes downwardly towards the other thigh strap 7. The rear strap 13 serves to prevent the thigh straps 7 falling down the backs of the occupant's legs so as to become out of position.

Returning now to consider FIG. 1, it will be seen that the occupant harness 1 is provided with a quick release box 16 of a type known per se. The quick release box 16 is located over the occupant's groin region when the occupant is wearing the occupant harness 1 and is framed by the waist strap 4 and the thigh straps 7. The quick release box 16 is retained in that position by a short transverse strap 17 which is secured to the back of the quick release box 16 and which passes between the two thigh straps 7. The quick release box 16 is located with respect to the waist band 4 by a substantially vertical strap 18 which extends from the rear of the quick release box 16 to the front central region 9 of the waist band 4.

The quick release box 16 serves as means to connect the occupant harness to the seat harness 2 in a releasable manner. The quick release box 16 will not be described in detail, but it should be appreciated that it essentially comprises a locking mechanism adapted to receive and lock therein three locking lugs which, as will be described, are carried by respective straps of the seat harness 2. Of course, it is also within the scope of the present invention for the quick release box 16 to receive and lock therein any other number of locking lugs. The quick release box 16 is provided with an occupant operable button which, when depressed and rotated, releases the locking mechanism and hence unlocks the locking lugs. This is a so-called dual-action quick release box. However, any other form of known quick release box can be employed.

It is important to note that the occupant's harness 1 of the present invention is configured to fit only around the abdominal area 19 of the occupant. The occupant harness 1 is therefore substantially clear of the occupant's torso when being worn by the occupant, which avoids any problems associated with the effective length of the occupant's upper body changing between a seated and a standing position. It should therefore be appreciated that the occupant harness 1 fits snugly around the occupant whether or not the occupant is sitting or standing, there being no need for substantial adjustments to the harness when moving from one position to the other.

Figure 3:
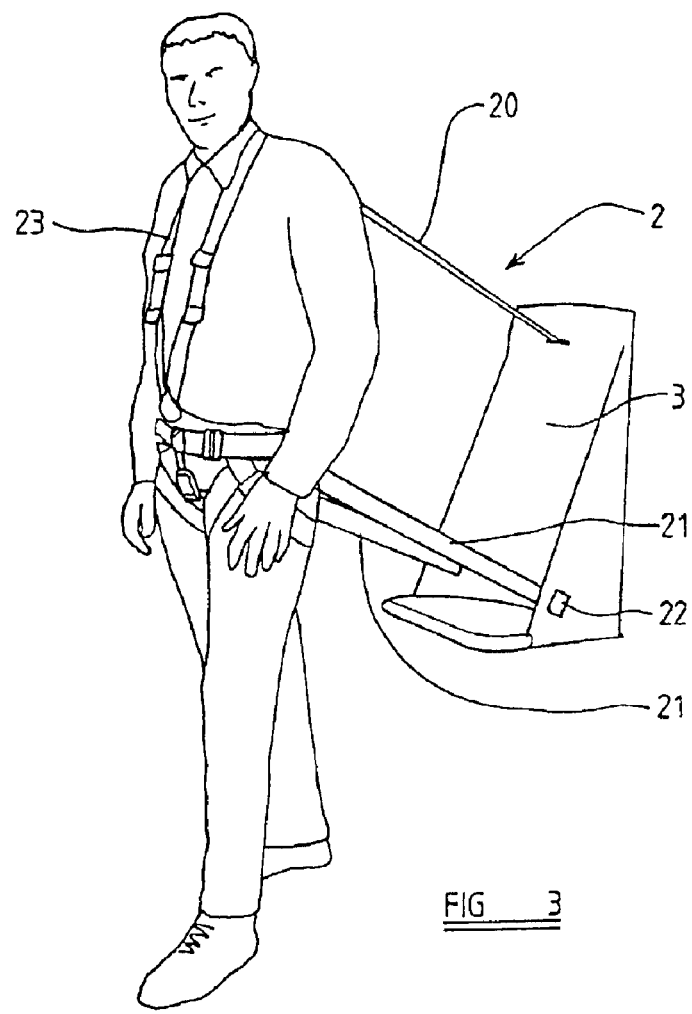
FIG. 3 is a perspective view illustrating an occupant wearing the occupant harness of FIGS. 1 and 2, the occupant harness being connected to a seat harness, the whole arrangement being illustrated in a paid out configuration.
Figure 4:
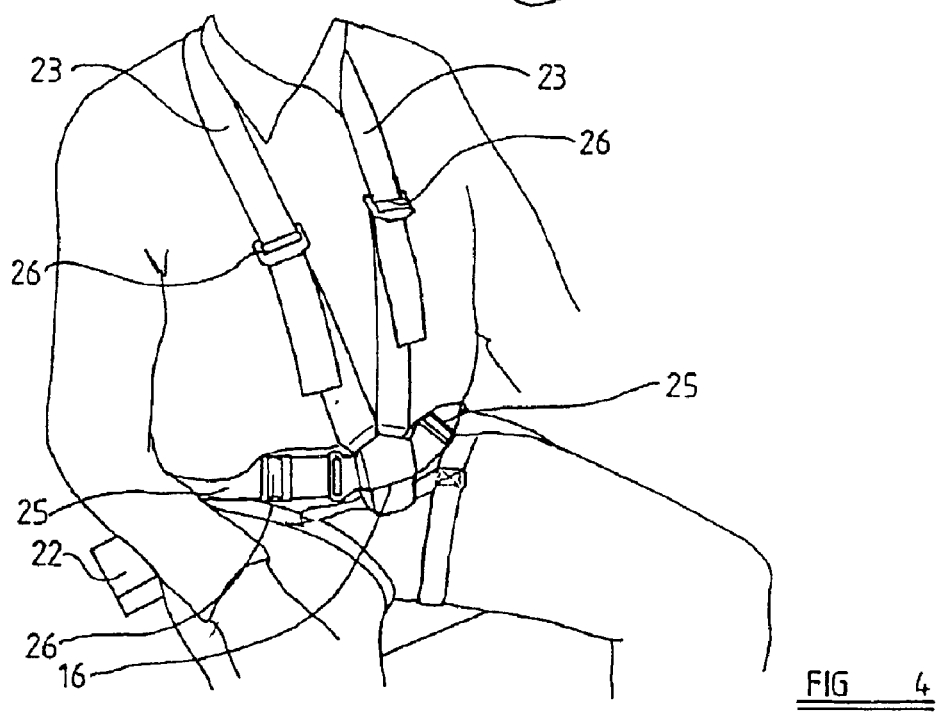
FIG. 4 is a perspective view of the harness arrangement of the present invention, illustrating its configuration when the occupant is restrained in the seat.

Turning now to consider FIGS. 3 and 4, the seat harness 2 comprises a plurality of straps 20, 21 which are each secured, by way of respective inertia reels 22 to the seat 3.

An upper seat strap 20 extends from the top of the seat back to a position generally between the occupant's shoulder blades (not shown) where the strap bifurcates into a pair of shoulder straps 23. Each shoulder strap 23 passes from the upper strap 20, over the occupant's shoulders, and down the front of the occupant's torso towards the quick release box 16 located over the occupant's groin region. Each shoulder strap 23 terminates with a metal locking lug 24 which, as mentioned previously, is adapted to be received by and locked within the quick release box 16, as illustrated in FIG. 4.

It is also possible for the seat harness 2 to be configured such that the shoulder straps 23 are each tethered to the top region of the seat back by way of respective inertia reels, thereby replacing the single upper seat strap 20 and its associated inertia reel. It is proposed to provide such an arrangement with a nape strap (not shown) to interconnect the two shoulder straps 23 across the nape of the occupant's neck to ensure prevent the shoulder straps 23 moving apart from one another and sliding off the occupant's shoulders.

The or each inertia reel 22 in the region of the top of the seat back for paying out the shoulder straps 23 or the upper seat strap 20, can be coupled to a manual locking mechanism (no shown) to lock up the inertia reel mechanisms. Such a locking mechanism is preferably actuated by a lever located for easy access by an occupant when sitting in the seat.

At the lower extent of the back rest of the seat 3, generally in the region where it joins the squab of the seat, a pair of lower seat straps 21 extend from respective sides of the seat 3. Each lower seat strap 21 extends around a respective side of the occupant's waist, and round the front of the occupant's waist towards the quick release box 16. In this way, the lower seat straps 21 can be considered to represent waist straps 25.

Each waist strap 25 terminates with a locking lug 24, identical to the locking lugs 24 of the shoulder strap 23. The locking lugs 24 of the waist straps 25 are again adapted to be received within and locked into the quick release box 16 as illustrated in FIG. 4 in a manner known per se.

Each shoulder strap 23 and waist strap 25 of the seat harness 2 is provided with tensioning means 26 of a friction type, known per se in the field of webbing straps, so as to allow the seat harness to be adjusted to fit the occupant correctly. As illustrated in the figures, each tensioning means 26 is located between the fixing point and the locking lug 24 of the respective strap.

FIG. 4 illustrates the complete harness arrangement of the present invention restraining an occupant as the occupant sits in the seat 3. The seat harness 2 can be seen to be connected to the occupant harness 1 by way of the connection between the locking lugs 24 of the shoulder straps 23 and the waist straps 25 being engaged within the quick release box 16 mounted on front of the occupant harness 1.

In the seating position illustrated in FIG. 4, each inertia reel 22 associated with a respective seat strap 20, 21, adopts its fully reeled-in condition such that the seat straps 20, 21 can be pulled generally taut between the occupant harness 1 and the seat 3 by tightening the tensioning means 26 of each waist strap 25 and shoulder strap 23. In a manner which will be described in more detail hereinafter, the seat straps 20, 21 are locked with respect to the seat, when the occupant adopts the seating position associated in FIG. 4, for take off and landing, to securely restrain the occupant in his seat against any sudden aircraft movements or crash situations.

However, once the aircraft is airborne, and the seat occupant wishes to leave the seat in order to perform his duties within the aircraft cabin, the locking mechanism which will be described in more detail hereinafter is released, such that the inertia reels 22 can pay out the seat straps 20, 21 and hence allow the occupant to stand and move away from the seat 3 as illustrated in FIG. 3. In the configuration illustrated in FIG. 3, the occupant is securely tethered to the seat 3 by way of the seat harness 2 and its associated inertia reels, thereby preventing the occupant from falling out of the aircraft. However, the occupant is allowed a significant degree of free movement to go about his duties.

Figure 5:
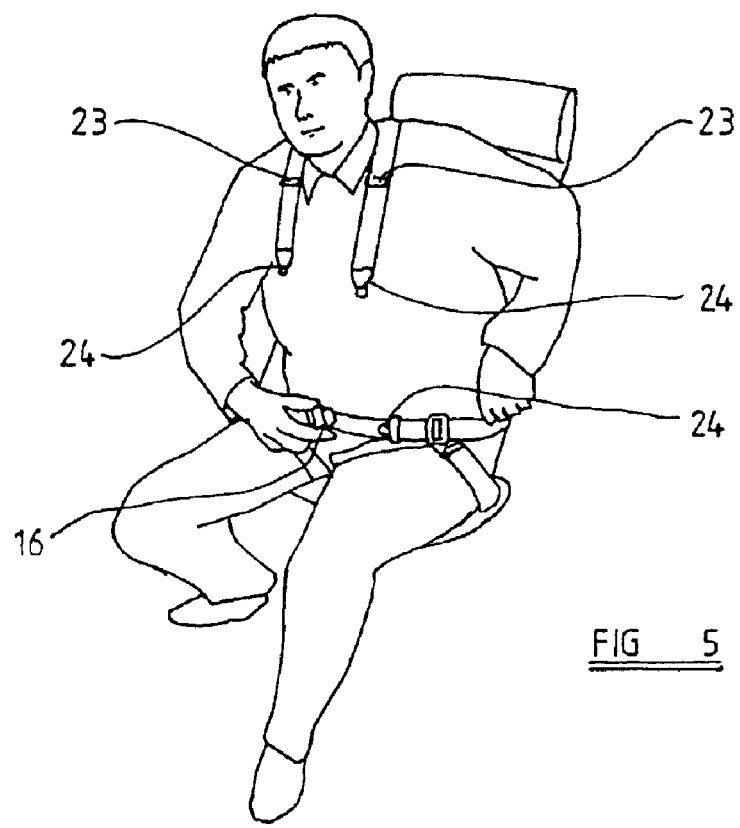
FIG. 5 is a perspective view illustrating an occupant disconnecting the seat harness from the occupant's harness to exit the harness arrangement of the present invention.

At any time, the occupant is able to release himself from the seat harness 2, simply by pressing and rotate the actuating button on the front of the dual-action quick release box 16. FIG. 5 illustrates the occupant doing this and it will be seen that the locking lugs 24 of the seat harness 2 become disengaged from the quick release box 16, thereby releasing the seat harness 2 from the occupant harness 1 and allowing the occupant to move clear of the seat harness 2 whilst still wearing the occupant harness 1. Whilst FIG. 5 illustrates the occupant exiting the seat harness 2 from a seated position, it will of course be appreciated that the occupant could also release the seat harness 2 from the occupant harness 1 from a standing position, for example as illustrated in FIG. 3, whereafter the inertia reels 22 would reel in the slack seat straps 20, 21, thereby tidying them away.

Figure 6:
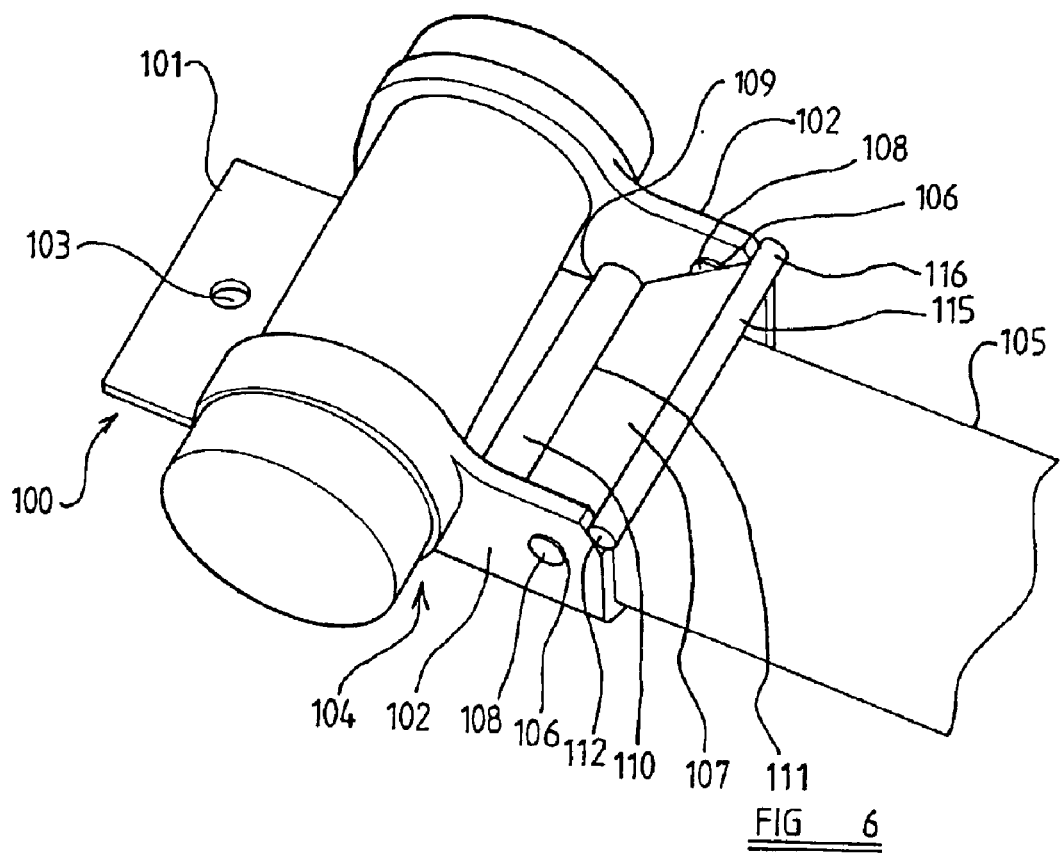
FIG. 6 is a perspective view of an inertia reel arrangement according to a second aspect of the present invention.

Turning now to consider FIG. 6, there is illustrated an inertia reel arrangement according to the second aspect of the present invention. The inertia reel arrangement comprises a metal support frame 100 having a substantially planar base plate 101 and a pair of generally planar side plates 102 upstanding from respective side edges of the base plate. The two generally planar side plates 102 are substantially parallel to one another.

The base plate 101 is provided with a number of fixing apertures 103 therethrough (only one illustrated in FIG. 6) to allow the base plate to be secured, for example by way of conventional bolts, to the seat 3.

Extending between the two side plates 102 and mounted for rotational movement relative thereto, there is provided a conventional inertia reel 104. The inertia reel 104 will not be described in detail here, but it should be appreciated that the inertia reel comprises a spool extending between the side plates 102 upon which is wound a length of webbing strap 105 as a coil of strap. Inside the spool of the inertia reel 104, there is provided an inertia mechanism which is configured to allow substantially unrestricted pay out of the webbing strap 105 from the inertia reel, provided the webbing strap 105 is pulled from the inertia reel in a substantially steady manner. However, should the webbing strap 105 be pulled from the reel in a sudden jerk, then the inertia mechanism locks up to prevent further pay out. The inertia reel mechanism is spring biased so as to reel in the webbing strap 105 unless a predetermined force pulling the webbing strap from the reel is applied. All of these features are common to known inertia reels already in use.

At a position spaced away from the inertia reel 104, each side plate 102 is provided within an aperture 106 therethrough, the two apertures 106 being aligned with one another. A locking member 107, in the form of a substantially planar paddle, is pivotally mounted to the support frame 100 between the two side plates 102. The locking member 107 is sized so as to fit between the two side plates 102, and is provided with a pair of co-aligned, outwardly projecting spigots 108, each spigot 108 being received within a respective aperture 106 for rotational movement therein. It will be seen from FIG. 6 that the locking member 107 is inclined in a locking position at an angle of approximately 45° with respect to the base plate 101, with its lower edge 111 being closest to the inertia reel 104.

As will be apparent from FIG. 6, the webbing strap 105 which is wound on the spool of the inertia reel 104 as a coil of webbing strap, is directed between the two side plates 102 in the general region of the base plate 101, as it leaves the inertia reel 104. It will therefore be seen that the webbing strap 105, as it leaves the inertia reel 104 passes between the base plate 101 and the pivotally mounted locking member 107.

Preferably, the locking member 107 is biased towards the plate 101, by way of biasing means (not illustrated). In the preferred arrangement, the locking member 107 is biased towards the base plate 101, but is restrained from bearing against the webbing strap 105 as the webbing strap 105 moves to and fro between the locking member 107 and the base plate 101. To achieve this, the uppermost corners 112 of the side plates 102 are chamfered to define a respective pair of stop surfaces 113 (seen most clearly in FIGS. 7 and 8). Each stop surface 113 is angled so as to make an acute angle with the vertical, as defined by the end face 114 of each respective side plate 102.

Whilst most of the extent of the locking member 107 is, as mentioned previously, sized so as to fit between the two side plates 102, the forward most edge 115 of the locking member 107 (being the edge spaced furthest from the inertia reel 104) is provided with a pair of substantially identical, outwardly directed projections 116 (seen most clearly at the right hand end of the locking member 107 as it appears in FIG. 6). It will be appreciated that with the locking member 107 mounted between the side plates 102 for rotation about its spigots 106, the two projections each extend outwardly past the inner most surface of the respective side plates 102.

Figure 7:
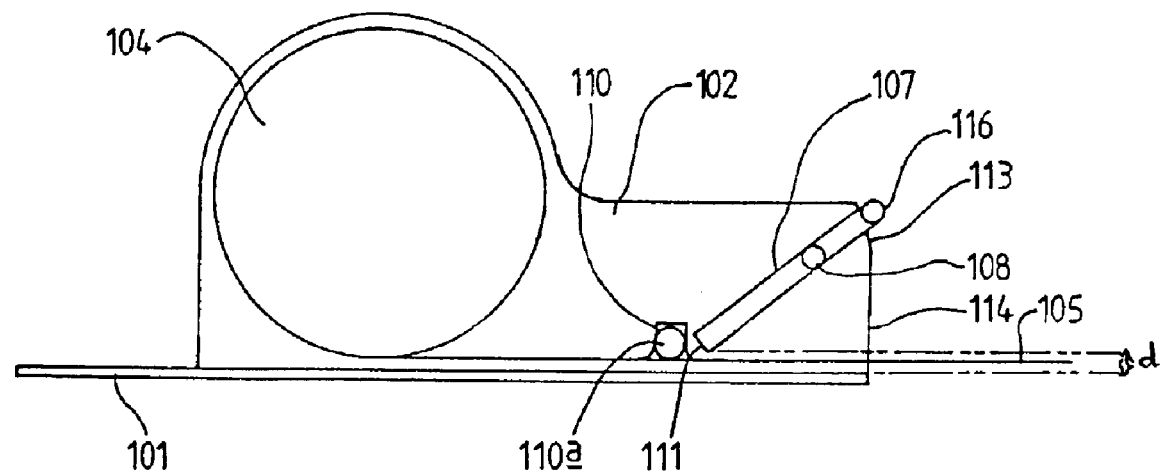
FIG. 7 is a longitudinal cross-sectional view of the arrangement of FIG. 6, illustrating a locking component in a first position.
Figure 8:
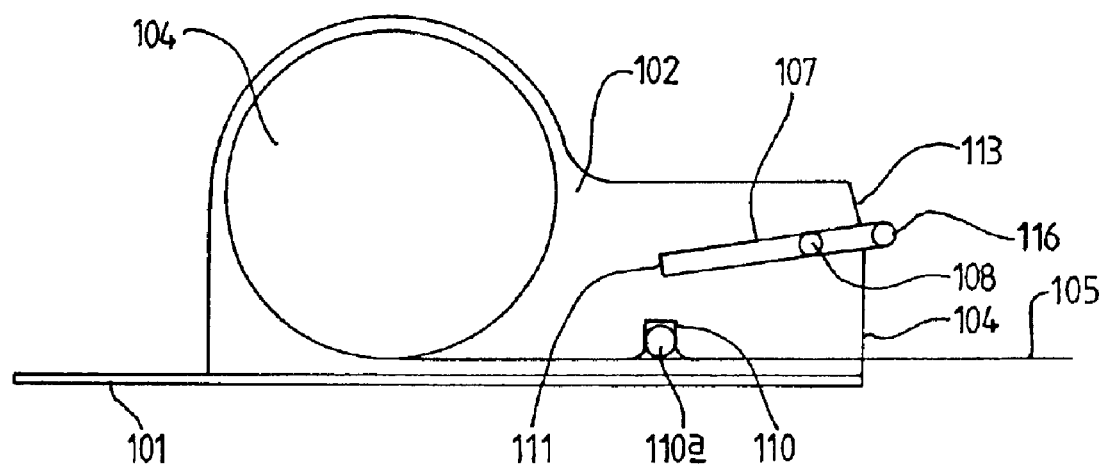
FIG. 8 is a view corresponding generally to that of FIG. 7, illustrating the locking component in a second position.

Turning now to consider FIGS. 7 and 8 of the accompanying representations, it will be seen that FIG. 7 illustrates the locking member 107 adopting a first position relative to the frame 100, whilst FIG. 8 illustrates the locking member 107 adopting a second position relative to the frame 100. The first position illustrated in FIG. 7 defines the limit of movement of the locking member 107 in the counter-clockwise sense as illustrated in FIG. 7. This limit of movement occurs by virtue of the relationship between the spigots 108 about which the locking member 107 rotates, the projections 116 and the angle of inclination of the stop surface 113. As illustrated in FIG. 7, at the limit of counter-clockwise rotation of the locking member 107, the projections 116 engage and bear against the uppermost region of the respective stop surfaces 113. In this position, the lower most edge 111 of the locking member 107 is spaced by a distance d from the uppermost surface of the base plate 101. Therefore, even though the locking member 107 is preferably biased towards the base plate 101, the lower most edge 111 of the locking member 107 will never actually engage the base plate 101, and this allows for generally unrestricted movement of the webbing strap 105 between the lower most edge 111 of the locking member 107 and the base plate 101, as the webbing strap 105 is paid out from the inertia reel 104 and as it is reeled into the inertia reel 104.

However, at a predetermined position 109, along the length of the webbing strap 105, there is provided on the webbing strap 105, a locking element 110, which, in the embodiment illustrated, takes the form of a substantially rigid bar 110a which is stitched into or otherwise secured to the webbing strap 105 across substantially the entire width of the webbing strap 105. The locking element 110 stands proud of the surface of the webbing strap 105.

As illustrated in FIG. 7, when the locking member 107 is in its first position in which the lowermost locking edge 111 is spaced from the base plate 101 by distance d, the locking edge 111 is actually spaced from the base plate 101 by a distance less than the vertical height of the locking element 110.

The locking edge 111 of the locking member 107 thus engages the locking element 110 as the locking element 110 is pulled in a pay out direction away from the inertia reel 104, thereby preventing movement of the locking element 110 past the locking member 107. In this way, it will be seen that the inertia reel arrangement of the second aspect of the present invention provides a mechanism to prevent pay out of the webbing strap 105 from the inertia reel, without relying upon the inertia reel mechanism itself locking up. It will be seen that the locking member 107 engages the strap (at the locking element 110) at a position spaced from the coil of webbing strap which is wound on the inertia reel 104.

It will therefore be appreciated that the above-described inertia reel arrangement provides means to lock the webbing strap 105 with respect to the base plate 101 (and hence also lock the strap 105 with respect to a seat when the base plate 101 is secured to the seat), independently of the inertia reel mechanism. This ensures that there is a direct load path between the strap and the base plate (and hence the seat 3), the load path not passing through the inertia reel mechanism. This serves to overcome problems associated with conventional inertia reel mechanisms, such as the coil of strap wound on the spool simply tightening to allow a degree of pay out of the strap when a load is applied to the strap. This is clearly undesirable in an aircraft crash situation. The direct load path arrangement of the present invention therefore meets civil aviation regulations for strap anchoring points, eliminating any latent pay out, slack or play in the inertia reel arrangement.

In order to release the afore-described locking mechanism, the locking member 107 can simply be manually rotated about its spigots 108 such that the locking edge 111 is caused to move away from the base plate 101 to such an extent that the locking element 110 can pass therebetween (as illustrated in FIG. 8). It will be appreciated from FIG. 8 that this rotation is unhindered by the stop surfaces 113, because of their acute angle to the vertical and their position relative to the apertures 106 and associate spigots 108. Pay out of the webbing strap 105 is thus enabled, and once the locking element 110 is clear of the locking member 107, pay out is substantially unrestricted. A preferred embodiment of this aspect of the invention is provided with means to lock releasably the locking member 7 in its upper position as illustrated in FIG. 8, against the bias applied to it, to allow unrestricted movement of the strap 105 therebelow.

It will be appreciated that due to the angle of inclination of the locking member 107 to the base plate 101, if the locking element 110 is allowed to approach the locking member 107 in a direction opposite to the paying out direction (i.e. as a webbing strap 105 is reeled in), it will be allowed to pass under the locking member 107, causing the locking member 107 to pivot about its spigots 108, moving the locking edge 111 away from the base plate 101. However, once the locking member 110 has passed the locking edge 111, the locking member 107, by virtue of its bias, will again pivot so that the locking edge 111 approaches the base plate 101, thereby preventing subsequent pay out of the webbing strap 105.

Whilst the present invention has been described with reference to specific embodiments, it should be appreciated that certain modifications could be made without departing from the scope of the invention. For example, whilst the invention has been described for use within seats in aircraft, it could equally be applied to seats for other users. Also, the inertia reel arrangement of the second aspect of the invention could be used to pay out and reel in cords such as cables or ropes instead of or as well as the straps or webbing which have been described.

In the present specification "comprise" means "includes or consists of" and "comprising" means "including or consisting of".

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

What is claimed is:

1. A spring loaded pay out arrangement for controlled pay out of a tether line, the arrangement comprising a spring loaded pay out inertia reel on which a tether line is wound; and locking means configured to engage the tether line at a position spaced from the wound line of the reel to prevent pay out of the tether line from the reel independently of the spring loaded pay out inertia reel, wherein the locking means is configured to engage a locking element fixed to the tether line at a predetermined point along the length of the tether line.

2. A spring loaded pay out arrangement according to claim 1, wherein the tether line is selected as one of the group consisting of: a strap, a cord, and webbing.

3. A spring loaded pay out arrangement according to claim 1, wherein the tether line is wound on the reel as a coil.

4. A spring loaded pay out arrangement according to claim 1, wherein the locking means comprises a locking member configured to engage the locking element to prevent movement of the locking element past the locking member in a pay out direction.

5. A spring loaded pay out arrangement according to claim 4 wherein the locking member is mounted for pivotal movement.

6. A spring loaded pay out arrangement for controlled pay out of a tether line, the arrangement comprising a string loaded pay out inertia reel on which a tether line is wound; and locking means configured to engage the tether line at a position spaced from the wound line of the reel to prevent pay out of the tether line from the reel independently of the spring loaded pay out inertia reel, wherein the locking means is configured to engage a locking element fixed to the tether line at a predetermined point along the length of the tether line, wherein the locking means comprises a locking member configured to engage the locking element to prevent movement of the locking element past the locking member in a pay out direction, and wherein the locking means is arranged to allow substantially unrestricted movement of the locking element past the locking member in a direction opposite to the pay out direction.

7. A spring loaded pay out arrangement for controlled pay out of a tether line, the arrangement comprising a spring loaded pay out inertia reel on which a tether line is wound; and locking means configured to engage the tether line at a position spaced from the wound line of the reel to prevent pay out of the tether line from the reel independently of the spring loaded pay out inertia reel, wherein the locking means is configured to engage a locking element fixed to the tether line at a predetermined point along the length of the tether line, wherein the locking means comprises a locking member configured to engage the locking element to prevent movement of the locking element past the locking member in a pay out direction, and wherein the locking member is biased towards the tether line.

8. A spring loaded pay out arrangement for controlled pay out of a tether line, the arrangement comprising a spring loaded pay out inertia reel on which a tether line is wound; and locking means configured to engage the tether line at a position spaced from the wound line of the reel to prevent pay out of the tether line from the reel independently of the spring loaded pay out inertia reel, wherein the locking means is configured to engage a locking element fixed to the tether line at a predetermined point along the length of the tether line and to be disengageable to permit further payout of the tether line.

* * * * *